UNITED STATES PATENT OFFICE.

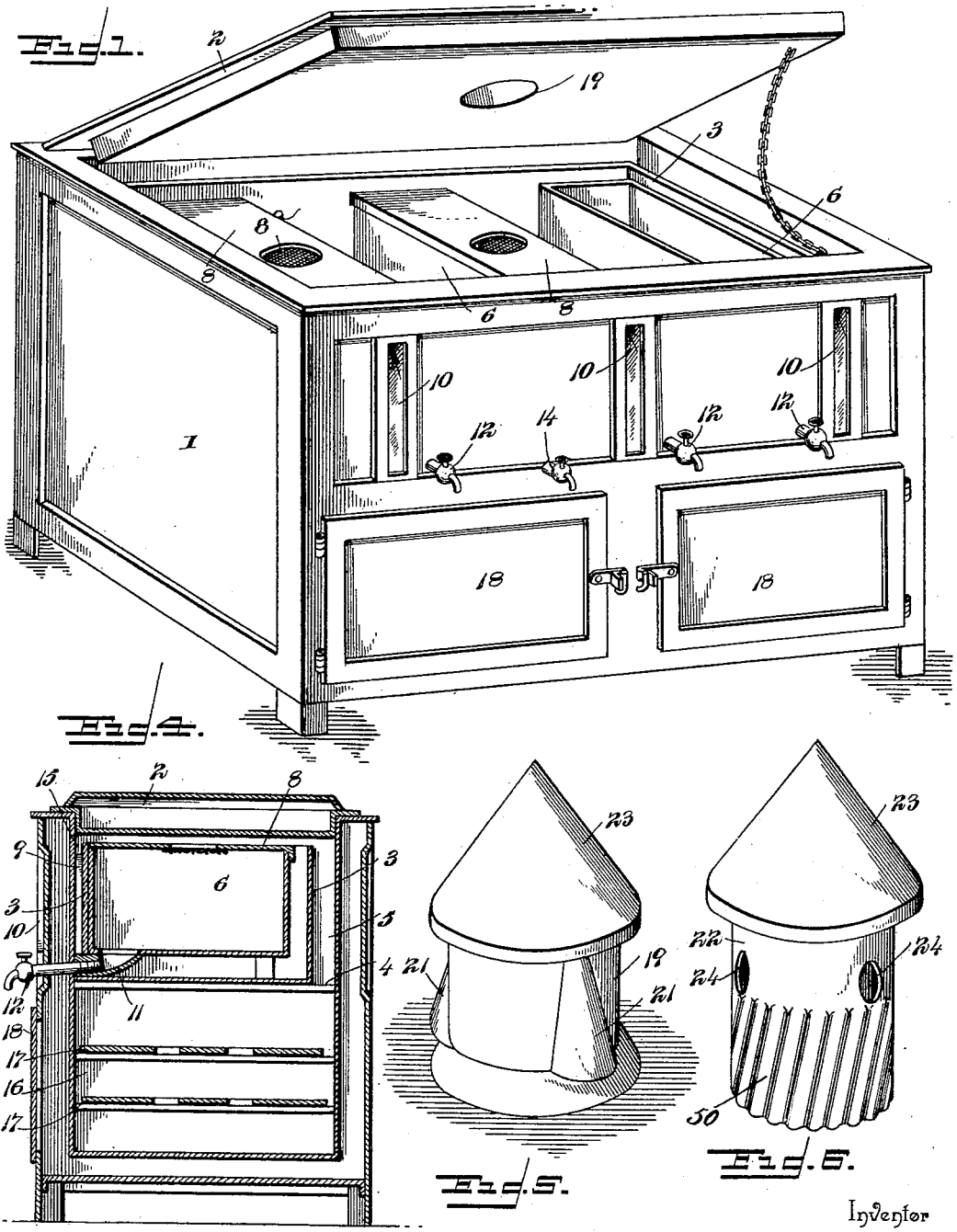

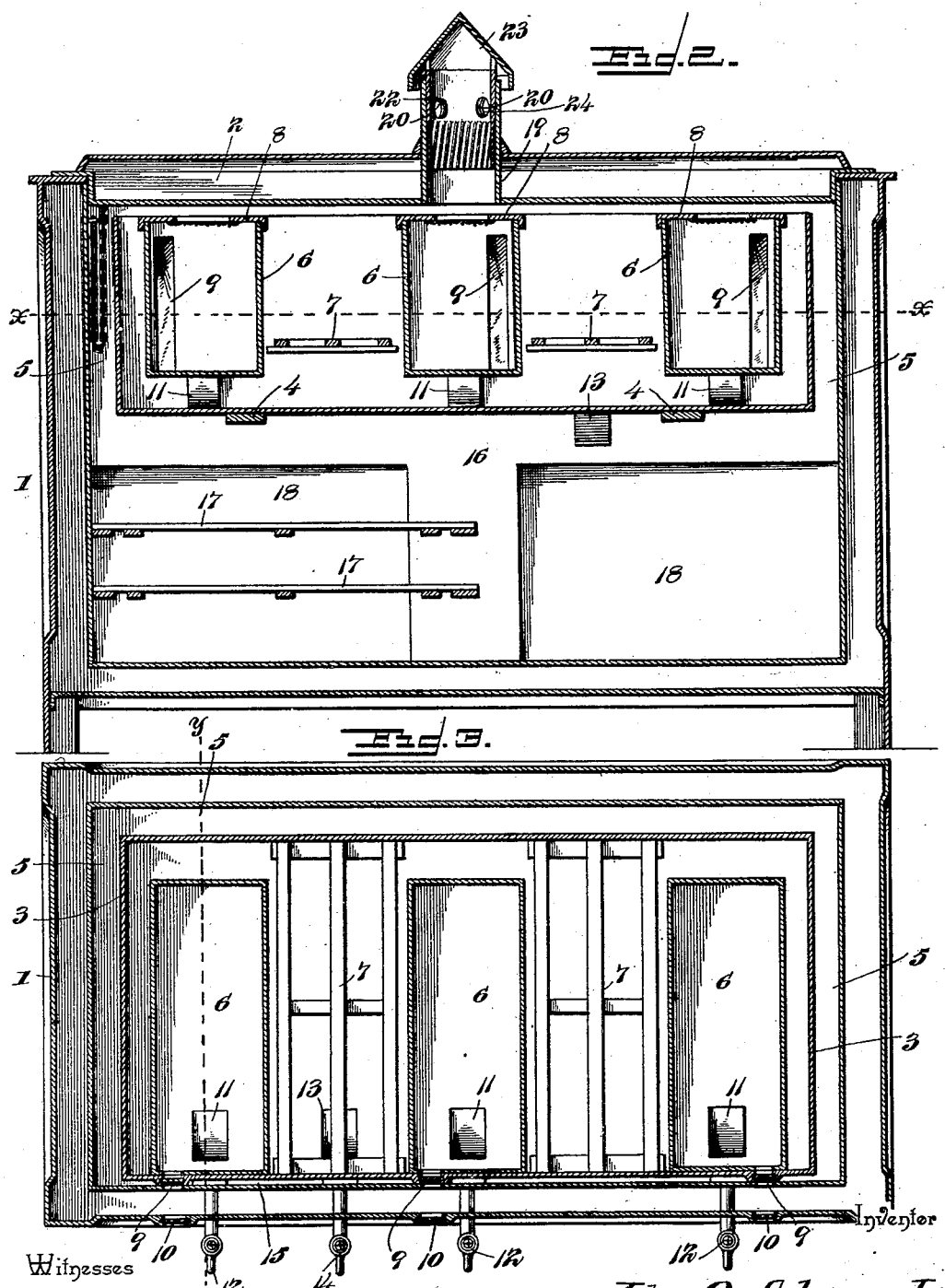

JOHN Q. ADAMS, JR., OF LAWN RIDGE, MISSOURI.

MILK-COOLER.

SPECIFICATION forming part of Letters Patent No. 630,835, dated August 15, 1899.

Application filed November 4, 1895. Serial No. 567,867. (No model.)

*To all whom it may concern:*

Be it known that I, JOHN Q. ADAMS, Jr., a citizen of the United States, residing at Lawn Ridge, in the county of Scotland and State of Missouri, have invented a new and useful Combined Milk-Cooler and Refrigerator, of which the following is a specification.

My invention relates to a milk-cooler and refrigerator designed to secure an efficient circulation of air and ventilation of the contents of the milk-receptacles and at the same time provide easy access to the various parts of the apparatus to facilitate cleansing.

A special object of my invention is to provide a compact arrangement of ice-box and milk-receptacles in a casing adapted for storage purposes whereby the circulation of air desirable in order to ventilate the contents of the milk-receptacles can be utilized also for carrying off odors emanating from vegetables or meats in the storage-compartment without affecting the contents of the milk-receptacles, the position of the ice-box within the casing being controlled to allow inspection of the contents of the milk-receptacles by the spigots which serve to withdraw said contents.

Further objects and advantages of this invention will appear in the following description, and the novel features thereof will be particularly pointed out in the appended claims.

In the drawings, Figure 1 is a perspective view of a milk-cooling and refrigerating apparatus constructed in accordance with my invention. Fig. 2 is a longitudinal section of the same, taken centrally. Fig. 3 is a horizontal section on the line $x$ $x$ of Fig. 2. Fig. 4 is a transverse vertical section on the line $y$ $y$ of Fig. 3. Fig. 5 is a detail view in perspective of the ventilator. Fig. 6 is a similar view of the adjustable member of the ventilator detached.

Similar numerals of reference indicate corresponding parts in all the figures of the drawings.

In the casing 1, which is double-walled to form an intervening dead-air space adapted to contain a heat-non-conducting medium, are arranged transverse supporting-bars 4, below which is a storage-compartment 16, accessible by means of doors 18 and provided with suitable shelves 17 or the equivalents thereof.

The casing is closed at its top by a lid or cover 2, which is also of double-walled construction and of which the inner wall is offset to extend downwardly into the casing or between the side and end walls thereof and break joint.

Located within the casing and approximately coextensive with the interior thereof is an ice-box 3, supported by the bars 4, said box, however, being of an area sufficiently less than the interior of the casing to arrange its side and end walls respectively out of contact with the adjacent walls of the casing. For convenience, however, the front wall of the ice-box is arranged close to the inner surface of the corresponding wall of the casing, but is held out of contact therewith by forwardly-projecting portions of the ice-box respectively contiguous to an inspection-pane 9 and outlets which are in communication with the interior of the box. These projections abut against the inner surface of the front wall of the casing to limit the forward movement of the ice-box upon the supporting-bars 4 and form a narrow space between said walls to allow a circulation of air.

Arranged within the ice-box are milk-receptacles 6, disposed at intervals and having their front end walls secured to and in contact with the front wall of the ice-box, while the top, bottom, side walls, and remaining end wall are spaced from the adjacent walls of the ice-box to allow contact therewith of the refrigerating contents of said box, ice-racks 7 being disposed between adjacent receptacles to support ice at a point above the plane of the bottom of the box. These milk-receptacles are provided with snugly-fitting covers 8, having ventilating-openings provided with interstitial or reticulated guards 8ª, and the tops of the receptacles 6 are flush with the upper edges of the walls of the ice-box and also are spaced slightly from the plane of the under surface of the casing lid or cover 2 to allow circulation of air over the top of the ice-box to communicate with a ventilator which is located centrally of the lid or cover. This ventilator in the construction illustrated consists of a fixed tube 19, extending vertically through the inner and outer walls of the cover and communicating with the interior of the casing, said tube being provided with ventilating-openings 24 and a cap 23, removably mounted to close the upper end of said tube 19 and provided with a tubular collar 22, which is crimped or reduced at its lower end, as shown at 50, to fit snugly and firmly in the bore of the tube 19, said collar 22 being provided with ventilating-openings 20, adapted for registration with the openings 24 of the tube 19 and also adapted by the turning of the cap to be arranged out of registration with said openings, and thereby close the same. Between the body portion of the cap and the upper end of the tubular collar 22 in the construction illustrated is a small space which I desire to remain permanently open, whereby even with the ventilating-openings 20 24 closed there will be sufficient circulation of air through the casing to carry off the fumes of the contents thereof. Obviously a greater extent of ventilation may be attained by arranging the parts of the ventilator to register the openings 20 and 24, or, in case of necessity, the cap may be entirely removed to allow free vent for the vaporous contents of the receptacles. The crimping of the lower end of the tubular collar 22 enables me to force said collar snugly into the bore of the stationary tube 19 to secure the adjustable cap in place at the desired adjustment, whereby the ventilating-openings 20 24 may be either wholly or partly alined or may be wholly non-alined.

The above-mentioned inspection-panes 9 are arranged to give a view of the contents of the milk-receptacles 6, said panes being arranged opposite registering slots formed, respectively, in the front walls of the ice-box and receptacles, and alined, respectively, with said inspection-panes are corresponding panes 10, let into the wall of the casing, whereby the depth of liquid in either of the receptacles can be ascertained from the exterior of the casing.

The ice box or tank is held in its proper position in the casing by means of spigots 12 and 14, of which the former communicates with outlets of the milk-receptacles 6, while the latter communicates with an outlet of the ice-box, said spigots extending through the inner and outer walls of the casing and being threaded into suitable seats formed in said outlets. As hereinbefore indicated, the projecting portions of the outlets bear against the inner surface of the inner wall of the casing to space the front wall of the ice-box from that of the casing; also, I preferably provide the milk-receptacles and the ice-box in communication with their outlets with depressed chutes 11 and 13 to facilitate the removal of all of the liquid contents of said receptacle and ice-box, the chutes serving to collect the liquid at points near the outlet.

From the foregoing description it will be seen that the removable ice-box in which the milk-receptacles are fixed is approximately coextensive with the interior of the casing, but is spaced at its side and end walls from the corresponding walls of the casing to form passages through which a circulation of air is afforded, the narrow space 15 between the front wall of the tank and the wall of the casing being sufficient to allow an upward current of heated air or a downward communication of chilled air, and that by the removal of the spigots, which normally hold the ice-box in its proper position, the latter is released for removal. Furthermore, it will be seen that the milk-receptacles and the containing ice-box are arranged at the top of the interior of the casing to leave an unobstructed storage-chamber therebelow; but the upper edges of the walls of the ice-box, with which the tops of the milk-receptacles are flush, are spaced downwardly from the plane of the under surface of the lid or cover sufficiently to allow a circulation of air thereover in order to reach the outlet formed by the ventilator, and this current of air passing horizontally over the perforated tops of the milk-receptacles serves to ventilate the latter by exhaustion, whereby the odors emanating from the contents of the storage-compartment are not communicated to the contents of the milk-receptacles.

The efficiency of the above-described apparatus depends to a material extent upon the fact that the vertical passages between the walls of the ice-box and the walls of the casing communicate with a flat horizontal passage located above the plane of the upper edges of the walls of the ice-box and between the same and the under flat surface of the top or cover, said horizontal passage communicating with the ventilator, and also upon the fact that the upper flat perforated covers of the milk-receptacles are located in the planes of the upper edges of the walls of the ice-box, and hence close to while spaced from the flat under surface of the top or cover. Thus air in circulating through the casing in its approach to the ventilator passes in a thin horizontal stream over the tops of all of the milk-receptacles to produce a suction in the milk-receptacles, whereby the desired exhaustion thereof to remove fumes is produced. Also it will be seen that the upper flat horizontal lids or covers of the milk-receptacles practically form the lower wall of the said horizontal passage, of which the upper wall is formed by the under surface of the lid or cover of the casing, and as each of the milk-receptacles is located between the vertical planes of the central ventilator and one of the upright walls of the ice-box it will be seen that any air rising between the walls of the ice-box and those of the casing, and thus entering the horizontal passage on its way to the ventilator, must pass across the perforated top of one or more of the milk-receptacles, and thus assist in ventilating the contents of those receptacles.

Another advantage of the above-described construction resides in the fact that the position of the ice-box in the casing is controlled by the spigots which are utilized to withdraw the liquid contents of the receptacles and ice-box, and as these spigots are exposed at the front of the casing any disarrangement of the ice-box, such as the backward displacement thereof, may be corrected by grasping the spigots and drawing said ice-box forward until its motion is checked by the contact of the projections on the front wall of the ice-box with the inner surface of the front wall of the casing to arrange the inspection-panes of the ice-box close to and in alinement with the inspection-panes of the casing to enable the contents of the milk-receptacles to be viewed without opening the casing or otherwise exposing the contents of the refrigerator.

Various changes in the form, proportion, and the minor details of construction may be resorted to without departing from the spirit or sacrificing any of the advantages of this invention.

Having described my invention, what I claim is—

1. The herein-described refrigerating apparatus, having a casing and a horizontal lid or cover provided with a centrally-located ventilator, horizontal supporting-bars connecting opposite walls of the casing, an open-topped ice-box removably seated upon said supporting-bars with its side and end walls spaced from those of the casing, and its upper edge spaced from the under surface of the lid or cover, to form a shallow horizontal passage connecting the spaces between the adjacent walls of the ice-box and casing with the ventilator, milk-receptacles arranged in the ice-box and provided with horizontal perforated lids or covers, flush with the upper edges of the ice-box and forming the lower wall of the said horizontal passage between the upper edges of the ice-box and the plane of the cover of the casing, each of said milk-receptacles being arranged between the vertical planes of the ventilator and one of the said walls of the ice-box, to provide for the horizontal passage thereover of a current of air approaching the ventilator, alined inspection-panes in adjacent walls of the ice-box and casing, to allow a view of the contents of the milk-receptacles, and spigots movably extending through the wall of the casing and connected with the ice-box, in communication with the same and the milk-receptacles, respectively, to maintain the ice-box with said inspection-panes in alinement, substantially as specified.

2. The herein-described refrigerating apparatus, having a casing and a flat lid or cover provided with a ventilator, horizontal supporting-bars arranged in the casing, an open-topped ice-box seated upon said bars with its side and end walls spaced from those of the casing and its upper edge spaced from the under surface of the lid or cover, said ice-box being provided in its front wall with inspection-panes and adjacent exterior spacing projections for contact with the front wall of the casing, to limit the forward movement of the ice-box, corresponding inspection-panes in the wall of the casing for alinement with those in the ice-box, milk-receptacles arranged in the ice-box and provided with horizontal perforated lids or covers flush with the upper edge of the ice-box, said receptacles being located between the vertical plane of the ventilator and one of the walls of the ice-box, and interiorly visible through said inspection-panes in the wall of the ice-box, and spigots movably extending through the front wall of the casing, and connected with the ice-box in communication, respectively, with the interiors of the receptacles and ice-box, to maintain the latter with its inspection-panes in alinement with those of the casing, and enable the box to be advanced toward the front wall of the casing until checked by said projections, substantially as specified.

In testimony that I claim the foregoing as my own I have hereto affixed my signature in the presence of two witnesses.

JOHN Q. ADAMS, Jr.

Witnesses:
G. E. LESLIE,
MILO COWAN.